US010284614B2

(12) United States Patent
Ryu

(10) Patent No.: US 10,284,614 B2
(45) Date of Patent: May 7, 2019

(54) METHOD FOR DOWNLOADING CONTENTS OF ELECTRONIC DEVICE AND ELECTRONIC DEVICE THEREOF

(71) Applicant: Samsung Electronics Co., Ltd., Suwon-si, Gyeonggi-do (KR)

(72) Inventor: Kyung-Hoo Ryu, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 580 days.

(21) Appl. No.: 14/558,882

(22) Filed: Dec. 3, 2014

(65) Prior Publication Data

US 2015/0163269 A1 Jun. 11, 2015

(30) Foreign Application Priority Data

Dec. 11, 2013 (KR) .................. 10-2013-0153987

(51) Int. Cl.
*H04L 29/06* (2006.01)
*H04W 4/50* (2018.01)
*H04W 4/80* (2018.01)

(52) U.S. Cl.
CPC ...... *H04L 65/4084* (2013.01); *H04L 65/1059* (2013.01); *H04L 65/4076* (2013.01); *H04L 65/605* (2013.01); *H04L 67/38* (2013.01); *H04W 4/50* (2018.02); *H04W 4/80* (2018.02)

(58) Field of Classification Search
CPC ........ H04L 65/60; H04L 67/38; H04W 4/001; H04W 4/008; H04W 4/00
USPC ........................................................ 709/204
See application file for complete search history.

(56) References Cited

U.S. PATENT DOCUMENTS

| 2001/0044339 | A1* | 11/2001 | Cordero ................. A63F 13/12 463/42 |
| 2004/0203800 | A1* | 10/2004 | Myhre .................. H04W 48/18 455/445 |
| 2006/0007947 | A1* | 1/2006 | Li ....................... H04L 12/1854 370/432 |
| 2006/0156377 | A1* | 7/2006 | Gentric ............... H04N 7/1675 725/138 |
| 2006/0179079 | A1* | 8/2006 | Kolehmainen ....... G06F 9/4862 |
| 2006/0190616 | A1* | 8/2006 | Mayerhofer ............ H04L 67/20 709/231 |
| 2006/0224760 | A1* | 10/2006 | Yu ........................ H04L 65/607 709/231 |

(Continued)

FOREIGN PATENT DOCUMENTS

KR  10-2013-0078463 A  7/2013
KR  10-2013-0082915 A  7/2013

(Continued)

*Primary Examiner* — Nicholas R Taylor
*Assistant Examiner* — Meng Vang
(74) *Attorney, Agent, or Firm* — Jefferson IP Law, LLP

(57) ABSTRACT

A method for downloading content of an electronic device and an electronic device thereof are provided. The method includes forming a network group with a guest terminal as a host terminal, acquiring a content download performance of the guest terminal, determining a quantity of content to be downloaded to the guest terminal, and transmitting a message for requesting the determined quantity of content to be downloaded to the guest terminal separately and a remaining quantity of content to be downloaded to the host terminal to a content provider server.

19 Claims, 10 Drawing Sheets

(56) References Cited

U.S. PATENT DOCUMENTS

| | | | |
|---|---|---|---|
| 2010/0135296 A1* | 6/2010 | Hwang | H04L 12/1836 370/390 |
| 2011/0138015 A1* | 6/2011 | Adriazola | G06F 8/61 709/219 |
| 2012/0124173 A1* | 5/2012 | De | H04L 12/5689 709/219 |
| 2013/0132469 A1* | 5/2013 | Levicki | H04L 65/4061 709/203 |
| 2013/0166684 A1 | 6/2013 | Park et al. | |
| 2014/0092730 A1* | 4/2014 | Yang | H04W 28/0226 370/229 |

FOREIGN PATENT DOCUMENTS

| | | |
|---|---|---|
| KR | 10-2013-0083689 A | 7/2013 |
| WO | 2013/100739 A1 | 7/2013 |

* cited by examiner

Request

| Method | HTTP / POST |
| --- | --- |
| URL | /storage/updateDeviceInfo |
| Description | Transmit an access path and a data transmission section of a designated network group |
| Condition | N/A |

| | API result type | JSON |
| --- | --- | --- |

Request Parameter

| List | Name | Mandatory | Description | Type | Constraint |
| --- | --- | --- | --- | --- | --- |
| | access_token | | API authentication key | string | AES encryption |
| deviceList | deviceIP | ○ | Global IP of terminal | string | |
| | deviceId | ○ | Device model ID | string | |
| | transferRange | ○ | Data section to be transmitted | string | |
| | hostYn | | Information on whether a terminal is a host terminal or not | string | |

FIG. 7

Request Example

```
URI:
http://[serviceDomain]/storage/updateDeviceInfo

HEADER:
accept: application/json

BODY:
{
 deviceList : [
  {
   deviceIp : "231.293.99.12",
   deviceId : "1",
   transferRange:"0~1000000",
   hostYn : "y"
  },
  {
   deviceIp : "231.293.99.23",
   deviceId : "2",
   transferRange:"1000001~1500000",
   hostYn : "n"
  },
  {
   deviceIp : "231.293.99.162",
   deviceId : "3",
   transferRange:"1500001~1700000",
   hostYn : "n"
  },
 ]
}
```

FIG.8

METHOD FOR DOWNLOADING CONTENTS OF ELECTRONIC DEVICE AND ELECTRONIC DEVICE THEREOF

CROSS-REFERENCE TO RELATED APPLICATION(S)

This application claims the benefit under 35 U.S.C. § 119(a) of a Korean patent application filed on Dec. 11, 2013 in the Korean Intellectual Property Office and assigned Serial number 10-2013-0153987, the entire disclosure of which is hereby incorporated by reference.

TECHNICAL FIELD

The present disclosure relates to a method for downloading content of an electronic device and an electronic device thereof.

BACKGROUND

Various kinds of electronic devices such as smartphones, tablet Personal Computers (PCs), etc., may access a server which provides content such as a movie, a game, etc., via a mobile communication network. For example, the server may be referred to as a content provider server and the electronic device may be referred to as a terminal.

The content provider server may download various kinds of content such as a movie, a game, etc., to a connected terminal via the mobile communication network. For example, a first terminal (terminal 1) and a second terminal (terminal 2) may access the content provider server via the mobile communication network and then may download online game content provided by the content provider server. For example, the first terminal and the second terminal may form a network group by using local communication such as Wireless Fidelity (Wi-Fi), Bluetooth (BT), etc., and then may execute the online game content downloaded from the content provider server simultaneously.

Accordingly, the user of the first terminal and the user of the second terminal may enjoy the online game content in group play by using the local communication. The group play refers to a plurality of users of terminals such as smartphones, tablet PCs, etc. sharing music, photos, videos, games, etc. in real time.

However, when each terminal individually downloads high-capacity content such as a movie, a game, etc., provided by the content provider server as described above, it takes a long time to download the content. Furthermore, when the download performance of a certain terminal is noticeably lower than the download performance of other terminals, the users should wait for a long time until they may execute the group play.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to solve at least the above-mentioned problems and/or disadvantages and to provide at least the advantages described below. Accordingly, an aspect of the present disclosure is to provide a method for downloading content of an electronic device, which may download content provided by a content provider server to terminals of a network group differently according to download performance of the terminals, and may allow the terminals to share the downloaded content with one another in real time by multicasting the content, and an electronic device thereof.

In accordance with an aspect of the present disclosure, a method for operating of an electronic device is provided. The method includes forming a network group with a guest terminal as a host terminal, acquiring a content download performance of the guest terminal, determining a quantity of content to be downloaded to the guest terminal, and transmitting a message for requesting the determined quantity of content to be downloaded to the guest terminal separately and a remaining quantity of content to be downloaded to the host terminal to a content provider server.

In accordance with another aspect of the present disclosure, an electronic device is provided. The electronic device includes a mobile communication module configured to access a mobile communication network, a local communication module configured to access a local communication network, and a processor configured to control operations of the mobile communication module and the local communication module. The processor is further configured to form a network group with a guest terminal as a host terminal, to acquire a content download performance of the guest terminal, and to determine a quantity of content to be downloaded to the guest terminal. The processor is further configured to transmit a message for requesting the determined quantity of content to be downloaded to the guest terminal separately and a remaining quantity of content to be downloaded to the host terminal to a content provider server.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 7 is a view illustrating elements of a request message transmitted from a host terminal to a content provider server according to an embodiment of the present disclosure;

FIG. 8 is a view illustrating a request message transmitted from a host to a content provider server according to an embodiment of the present disclosure;

Throughout the drawings, it should be noted that like reference numbers are used to depict the same or similar elements, features, and structures.

DETAILED DESCRIPTION

Figure 1:
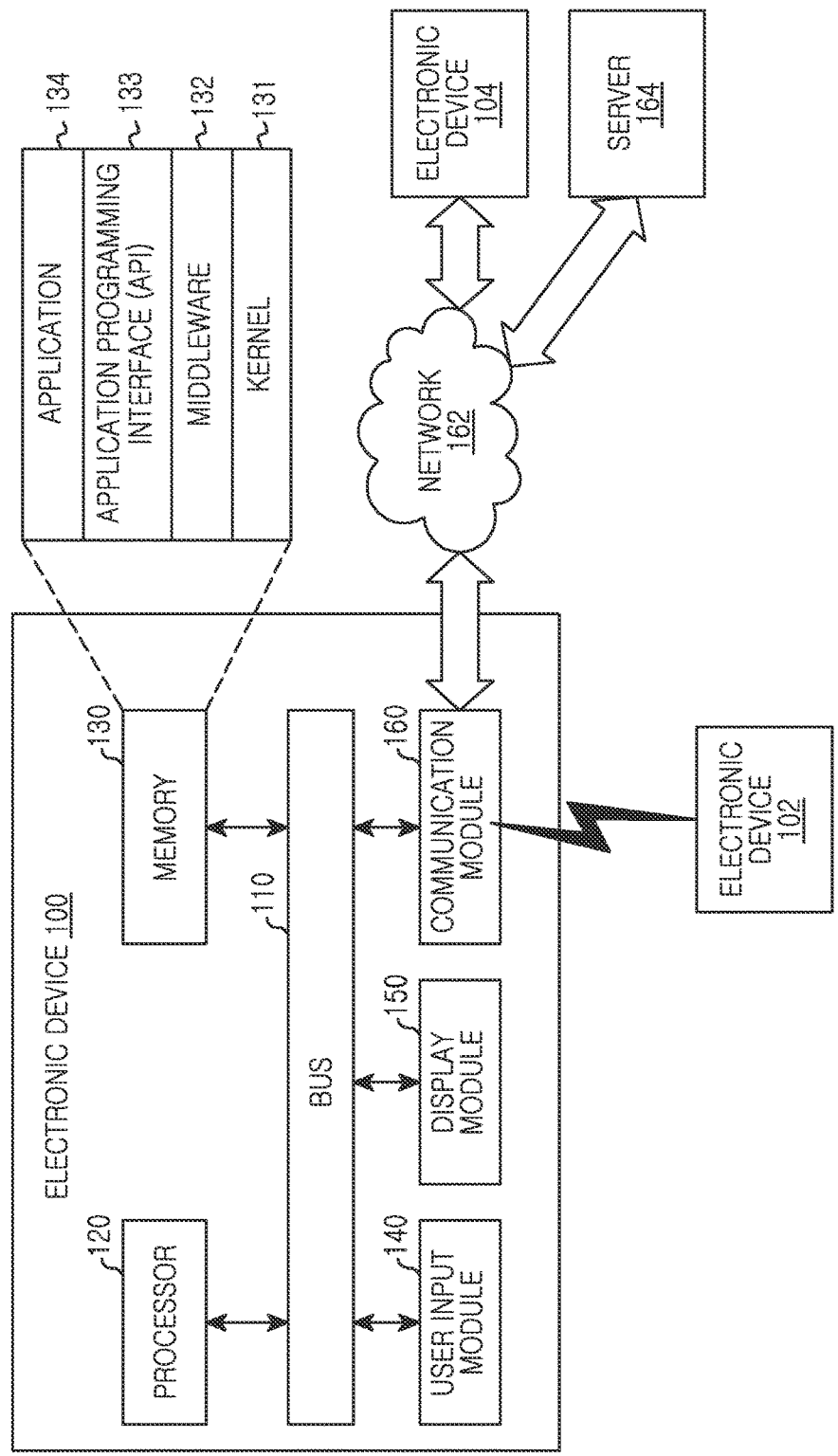
FIG. 1 is a block diagram of an electronic device according to an embodiment of the present disclosure.

The following description with reference to the accompanying drawings is provided to assist in a comprehensive understanding of various embodiments of the present disclosure as defined by the claims and their equivalents. In includes various specific details to assist in that understanding but these are to be regarded as merely exemplary. Accordingly, those of ordinary skill in the art will recognize that various changes and modifications of the various embodiments described herein may be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

An electronic device according to various embodiments of the present disclosure may be a device which is equipped with a communication function. For example, the electronic device may be one or a combination of one or more of various devices, such as a smartphone, a tablet Personal Computer (PC), a mobile phone, a video phone, an electronic book reader, a desktop PC, a laptop PC, a net book computer, a Personal Digital Assistant (PDA), a Portable Multimedia Player (PMP), an MP3 player, a mobile medical machine, an electronic bracelet, an electronic necklace, an electronic appcessory, a camera, a wearable device, an electronic clock, a wrist watch, a smart white appliance (e.g., a refrigerator, an air conditioner, a cleaner, an artificial intelligence robot, a Television (TV), a Digital Video Disk (DVD) player, a stereo, an oven, a microwave oven, a washing machine, an air cleaner, an electronic album, etc.), various medical machines (e.g., Magnetic Resonance Angiography (MRA), Magnetic Resonance Imaging (MRI), Computerized Tomography (CT), a tomograph, an ultrasound machine, etc.), a navigation device, a Global Positioning System (GPS) receiver, an Event Data Recorder (EDR), a Flight Data Recorder (FDR), a set-top box, a TV box (e.g., Samsung HomeSync™, Apple TV™, or Google TV™), an electronic dictionary, an automotive infotainment device, an electronic equipment for ship (for example, a navigation equipment for ship, a gyro compass, etc.), avionics, a security device, electronic clothing, an electronic key, a camcorder, a game console, a Head-Mounted-Display (HMD), a flat panel display device, an electronic album, a part of furniture or a building/structure equipped with a communication function, an electronic board, an electronic signature receiving device, or a projector. It is obvious to an ordinary skilled person in the related art that the electronic device according to various embodiments of the present disclosure is not limited to the above-mentioned devices.

FIG. 1 is a block diagram of an electronic device according to an embodiment of the present disclosure.

Referring to FIG. 1, the electronic device 100 may include a bus 110, a processor 120, a memory 130, a user input module 140, a display module 150, and a communication module 160, but is not limited thereto. The bus 110 may be a circuit which connects the above-described elements to one another and transmits communication (e.g., a control message) among the above-described elements.

For example, the processor 120 may receive an instruction from other elements described above (e.g., the memory 130, the user input module 140, the display module 150, the communication module 160, etc.) via the bus 110, decipher the received instruction, and perform an operation or data processing according to the deciphered instruction. The memory 130 may store an instruction and/or data which is received from the processor 120 and/or other elements (e.g., the user input module 140, the display module 150, the communication module 160, etc.) or generated by the processor 120 and/or other elements.

For example, the memory 130 may include programming modules such as a kernel 131, middleware 132, an Application Programming Interface (API) 133, and an application 134. Each of the programming modules may be configured by software, firmware, hardware, or a combination of two or more of them. The kernel 131 may control or manage system resources (e.g., the bus 110, the processor 120 and/or the memory 30, etc.) which are used for performing operations or functions implemented by the other programming modules, for example, the middleware 132, the API 133, and/or the application 134.

The kernel 131 may provide an interface for allowing the middleware 132, the API 133, and/or the application 134 to access an individual element of the electronic device 100 and control or manage the element. The middleware 132 may serve as an intermediary to allow the API 133 or the application 134 to communicate with the kernel 131 and exchange data with the kernel 131. In addition, the middleware 132 may perform load balancing with respect to work requests received from the application 134 (a plurality of applications), for example, by giving priority to use the system resources of the electronic device 100 (for example, the bus 110, the processor 120, the memory 130, etc.) to at least one of the applications 134 (the plurality of applications).

The API 133 is an interface for allowing the application 134 to control a function provided by the kernel 131 or the middleware 134, and, for example, may include at least one interface or function for controlling a file, controlling a window, processing an image, or controlling a text. For example, the user input module 140 may receive an instruction or data from the user and may transmit the same to the processor 120 or the memory 130 via the bus 110, and the display module 150 may display an image, a video, or data for the user.

The communication module 160 may connect communication between the electronic device 100 and another electronic device 102. The communication module 160 may support a predetermined local communication protocol (e.g., Wireless Fidelity (Wi-Fi), Bluetooth (BT), Near Field Communication (NFC), or predetermined network communication 162 (e.g., Internet, a Local Area Network (LAN), a Wide Area Network (WAN), a telecommunication network, a cellular network, a satellite network, a Plain Old Telephone Service (POTS), etc.). Each of the electronic devices 102 and 104 may be the same device as the electronic device 100 (e.g., the same type of device) or a different device (e.g., a different type of device). An example of a different type of device would be the server 164.

Figure 2:
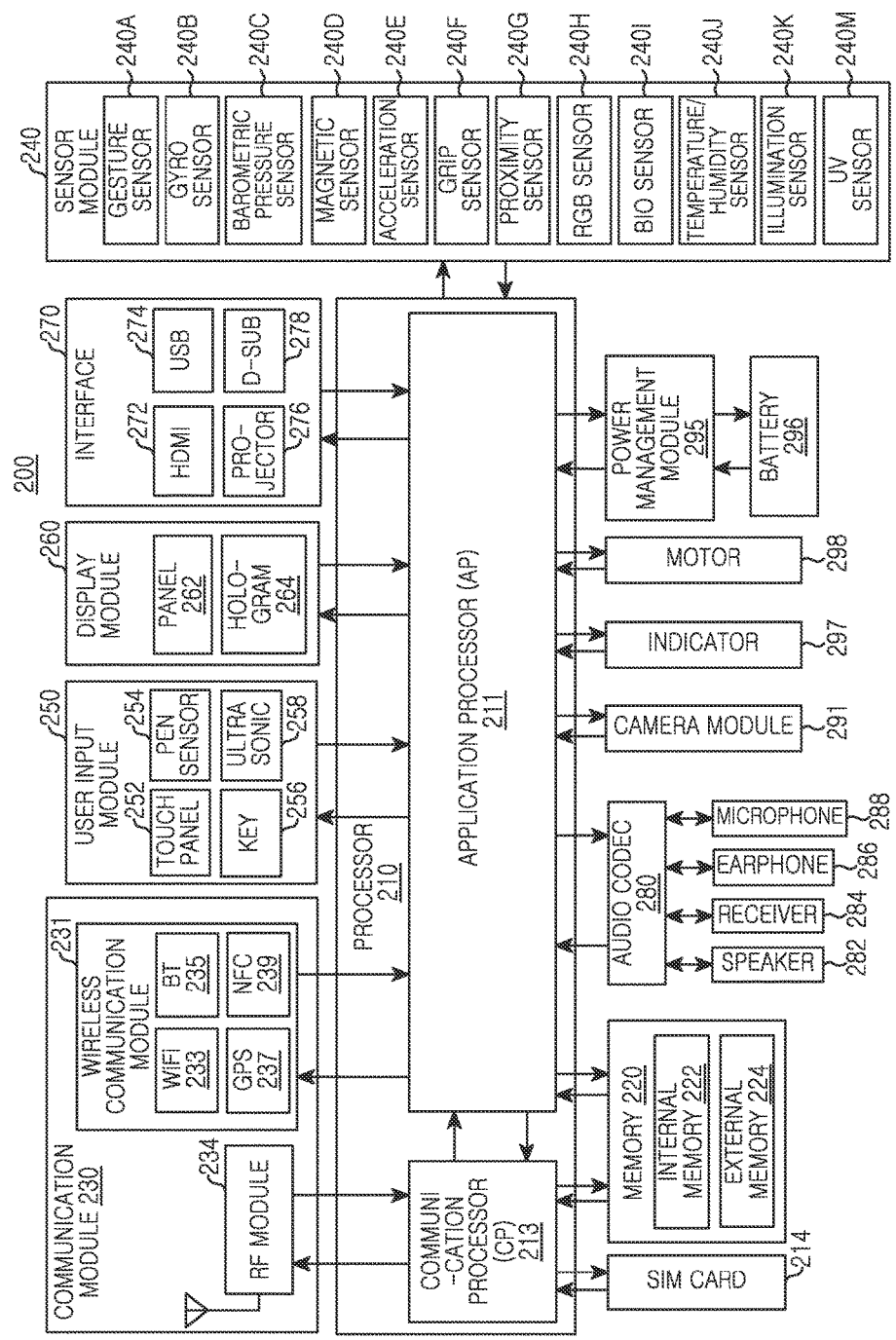
FIG. 2 is a block diagram of hardware according to an embodiment of the present disclosure.

FIG. 2 is a block diagram of hardware according to an embodiment of the present disclosure. The hardware 200 may be the electronic device 100 illustrated in FIG. 1, for example.

Referring to FIG. 2, the hardware 200 may include one or more processors 210, a Subscriber Identification Module (SIM) card 214, a memory 220, a communication module 230, a sensor module 240, a user input module 250, a display module 260, an interface 270, an audio Compression/Decompression Module (CODEC) 280, a camera module 291, a power management module 295, a battery 296, an indicator 297, and a motor 298, but is not limited thereto. The processor 210 (e.g., the processor 120) may include one or more Application Processors (APs) 211 or one or more Communication Processors (CPs) 213.

The processor 210 may be the processor 120 shown in FIG. 1, for example, in FIG. 1, the AP 211 and the CP 213 are included in the processor 210. However, the AP 211 and the CP 213 may be included in different Integrated Circuit (IC) packages. According to an embodiment of the present disclosure, the AP 211 and the CP 213 may be included in a single IC package. The AP 211 may control a plurality of hardware and/or software elements connected to the AP 211 by driving an operation system or an application program, and may process and calculate various data including multimedia data. The AP 211 may be implemented by using a System On chip (SoC), for example. According to an embodiment of the present disclosure, the processor 210 may further include a Graphic Processing Unit (GPU) (not shown).

The CP 213 may manage a data link in communication between an electronic device (e.g., the electronic device 100) including the hardware 200 and other electronic devices connected via a network, and may convert a communication protocol. The CP 213 may be implemented by using a SoC, for example. According to an embodiment of the present disclosure, the CP 213 may perform at least a part of multimedia control functions. The CP 213 may identify or authenticate a terminal in the communication network by using a subscriber identification module (e.g., the SIM card 214). In addition, the CP 213 may provide services such as voice communication, video communication, a text message, or packet data to the user.

In addition, the CP 213 may control data exchange of the communication module 230. Although the elements like the CP 213, the power management module 295, or the memory 220 are separate elements from the AP 211 in FIG. 2, the AP 211 may be implemented to include at least a part of the above-described elements (for example, the CP 213) according to an embodiment of the present disclosure. According to an embodiment of the present disclosure, the AP 211 or the CP 213 may load an instruction and/or data which is received from a non-volatile memory and/or at least one of other elements connected to the AP 211 and the CP 213 into a volatile memory, and may process the instruction or data.

In addition, the AP 211 or the CP 213 may store data which is received from at least one of other elements or data which is generated by at least one of other elements in the non-volatile memory. The SIM card 214 may be a card in which a subscriber identification module is implemented, and may be inserted into a slot formed on a specific location of the electronic device. The SIM card 214 may include its unique identification information (for example, an Integrated Circuit Card Identifier (ICCID)) or subscriber information (for example, International Mobile Subscriber Identity (IMSI)). The memory 220 may include an internal memory 222 or an external memory 224.

For example, the memory 220 may be the memory 130 shown in FIG. 1. For example, the internal memory 222 may include at least one of a volatile memory (for example, a Dynamic Random Access Memory (DRAM), a Static Random Access Memory (SRAM), a Synchronous DRAM (SDRAM), etc.) and a non-volatile memory (for example, an One-Time Programmable Read Only Memory (OTPROM), a Programmable Read Only Memory (PROM), an Erasable Programmable Read Only Memory (EPROM), an Electrically Erasable Programmable Read Only Memory (EEPROM), a mask ROM, a flash ROM, a NAND flash memory, a NOR flash memory, etc.). According to an embodiment of the present disclosure, the internal memory 222 may be a Solid State Driver (SSD). The external memory 224 may further include Compact Flash (CF), Secure Digital (SD), Micro-SD, Mini-SD, extreme Digital (xD), memory stick, etc.

The communication module 230 may include a wireless communication module 231 or a Radio Frequency (RF) module 234. For example, the communication module 230 may be the communication module 160 shown in FIG. 1. For example, the wireless communication module 231 may include WiFi 233, BT 235, GPS 237, and/or NFC 239. For example, the wireless communication module 231 may provide a wireless communication function using radio frequency. Additionally or alternatively, the wireless communication module 231 may include a network interface (e.g., a LAN card) or a modem for connecting the hardware 200 to a network (e.g., Internet, LAN, WAN, a telecommunication network, a cellular network, a satellite network, POTS, etc.)

The RF module 234 may exchange data, for example, may exchange RF signals or called electronic signals. Although not shown, the RF module 234 may include a transceiver, a Pluggable Authentication Module (PAM), a frequency filter, or a Low Noise Amplifier (LNA), for example. In addition, the RF module 234 may further include a part for exchanging electromagnetic waves in a free space in wireless communication, for example, a conductor or conducting wire.

For example, the sensor module 240 may include at least one of a gesture sensor 240A, a gyro sensor 240B, a barometric pressure sensor 240C, a magnetic sensor 240D, an acceleration sensor 240E, a grip sensor 240F, a proximity sensor 240G, a Red, Green, Blue (RGB) sensor 240H, a biosensor 240I, a temperature/humidity sensor 240J, an illumination sensor 240K, or an Ultraviolet (UV) sensor 240M. The sensor module 240 may measure a physical quantity or detect an operation state of the electronic device, and convert measured or detected information into electric signals. Additionally or alternatively, the sensor module 240 may include an E-nose sensor (not shown), an electromyography (EMG) sensor (not shown), an electroencephalogram (EEG) sensor (not shown), an electrocardiogram (ECG) sensor (not shown), a fingerprint sensor, etc. The sensor module 240 may further include a control circuit to control at least one sensor included therein.

The user input module 250 may include a touch panel 252, a (digital) pen sensor 254, a key 256, or an ultrasonic input device 258. For example, the user input module 250 may be the user input module 140 shown in FIG. 1. For example, the touch panel 1052 may recognize a touch input in at least one method of capacitive, resistive, infrared, and ultrasonic methods. In addition, the touch panel 252 may further include a controller (not shown). In the case of a capacitive method, the touch panel 252 may recognize not only physical contact but also approach. The touch panel 252 may further include a tactile layer. In this case, the touch panel 252 may provide a tactile response to the user.

The (digital) pen sensor 254 may be implemented in the same or similar method as or to the method of receiving a user's touch input or by using a separate recognition sheet. As the key 256, a keypad or a touch key may be used. The ultrasonic input device 258 allows a terminal to detect sound waves through a microphone (e.g., the microphone 288) through a pen generating ultrasonic signals, and is capable of wireless recognition. According to an embodiment of the present disclosure, the hardware 200 may receive a user input from an external device connected thereto (e.g., a network, a computer, or a server) by using the communication module 230.

The display module 260 may include a panel 262 or a hologram 264. For example, the display module 260 may be the display module 150 shown in FIG. 1. For example, the panel 262 may be a Liquid Crystal Display (LCD) or an Active Matrix Organic Light Emitting Diode (AM-OLED). For example, the panel 262 may be implemented flexibly, transparently, or to be wearable. The panel 262 may be configured as a single module along with the touch panel 252. The hologram 264 may show a stereoscopic image in the air using interference of light. According to an embodiment of the present disclosure, the display module 260 may further include a control circuit to control the panel 262 or the hologram 264.

The interface 270 may include a High Definition Multimedia Interface (HDMI) 272, a Universal Serial Bus (USB) 274, a projector 276, and/or a D-subminiature (D-sub) 278. Additionally or alternatively, the interface 270 may include a Secure Digital (SD)/Multimedia Card (MMC) (not shown) or Infrared Data Association (IrDA) (not shown). The audio CODEC 280 may convert a sound and electric signal bidirectionally. For example, the audio CODEC 280 may convert sound information which is input or output through a speaker 282, a receiver 284, an earphone 286, or a microphone 288.

The camera module 291 is a device for photographing an image and a moving image, and may include one or more image sensors (for example, a front surface sensor or a rear surface sensor), an Image Signal Processor (ISP) (not shown), or a flash LED. The power management module 295 may manage power of the hardware 200. Although not shown, the power management module 295 may include a Power Management IC (PMIC), a charging IC, or a battery fuel gage.

For example, the PMIC may be mounted in an integrated circuit or a SoC semiconductor. The charging method may be divided into a wired charging method and a wireless charging method. The charging IC may charge a battery and may prevent inflow of overvoltage or over current from a charger. According to an embodiment of the present disclosure, the charging IC may include a charging IC for at least one of the wired charging method and the wireless charging method. The wireless charging method may include a magnetic resonance method, a magnetic induction method, or an electromagnetic wave method, and an additional circuit for charging wirelessly, for example, a circuit such as a coil loop, a resonant circuit, a rectifier, etc. may be added.

For example, the battery fuel gage may measure a remaining battery life of the battery 296, a voltage, a current, or temperature during charging. The battery 296 generates electricity and supplies power. For example, the battery 296 may be a rechargeable battery. The indicator 297 may display a specific state of the hardware 200 or a part of it (e.g., the AP 211), for example, a booting state, a message state, or a charging state. The motor 298 may convert an electric signal into a mechanical vibration. A Main Control Unit (MCU) (not shown) may control the sensor module 240. Although not shown, the hardware 200 may include a processing device (e.g., a GPU) for supporting a mobile TV. The processing device for supporting the mobile TV may process media data according to standards such as Digital Multimedia Broadcasting (DMB), Digital Video Broadcasting (DVB), or media flow.

The names of the above-described elements of the hardware according to various embodiments of the present disclosure may vary according to a kind of electronic device. The hardware according to various embodiments of the present disclosure may include at least one of the above-described elements, and some of the elements may be omitted or an additional element may be further included. In addition, some of the elements of the hardware according to various embodiments of the present disclosure may be combined into a single entity, and may perform the same functions as those of the elements before being combined.

Figure 3:
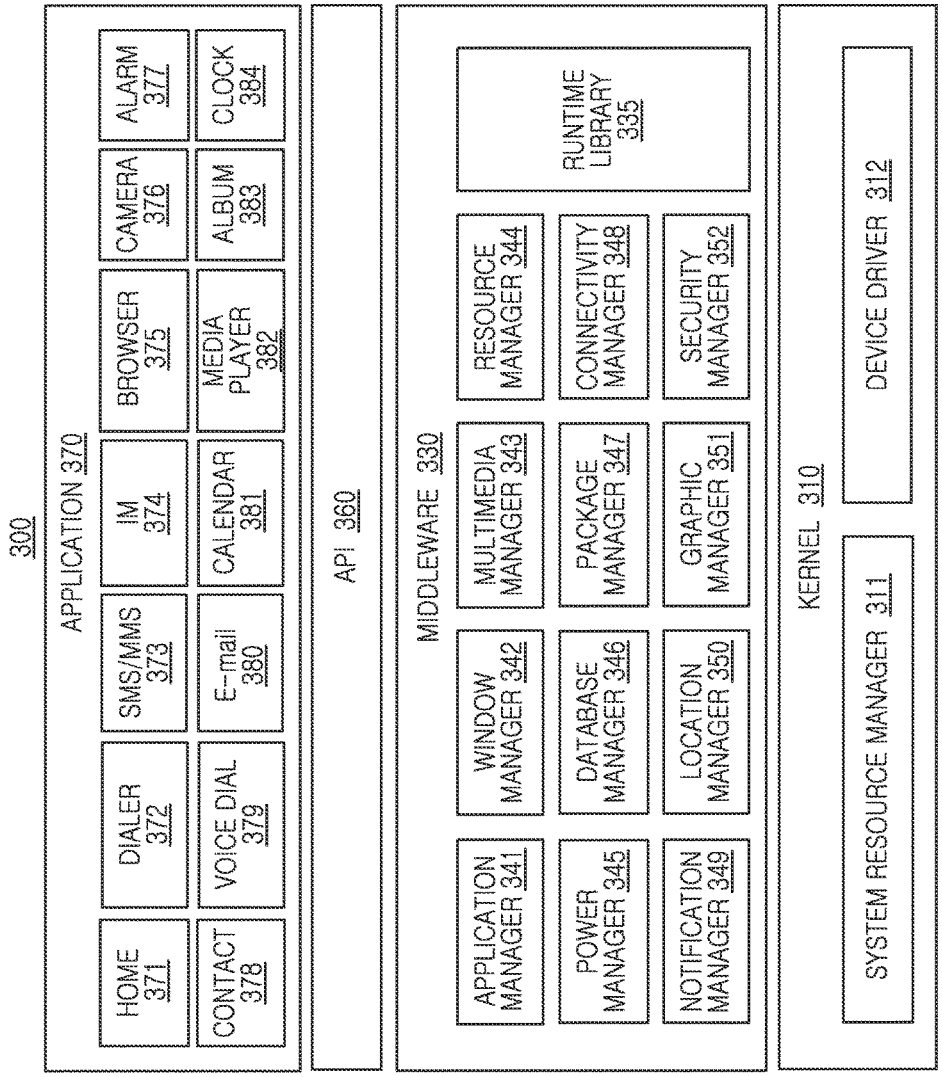
FIG. 3 is a block diagram of a programming module according to an embodiment of the present disclosure.

FIG. 3 is a block diagram of a programming module according to an embodiment of the present disclosure.

Referring to FIG. 3, the programming module 300 may be included (e.g., stored) in the electronic device 100 (e.g., the memory 130) shown in FIG. 1. At least a part of the programming module 300 may be configured by software, firmware, hardware, or a combination of two or more of them. The programming module 300 may include an Operation System (OS) implemented in hardware (e.g., the hardware 200) for controlling resources related to an electronic device (e.g., the electronic device 100) or various applications (e.g., the application 370) driven on the OS.

For example, the OS may be Android, iOS, Windows, Symbian, Tizen, Bada, etc. The programming module 300 may include a kernel 310, middleware 330, an API 360, or an application 370. The kernel 310 (e.g., the kernel 131) may include a system resource manager 311 or a device driver 312. For example, the system resource manager 311 may include a process manager (not shown), a memory manager (not shown), a file system manager (not shown), etc.

The system resource manager 311 may control, allocate, or collect system resources. For example, the device driver 312 may include a display driver (not shown), a camera driver (not shown), a Bluetooth driver (not shown), a share memory driver (not shown), a USB driver (not shown), a keypad driver (not shown), a WiFi driver (not shown), or an audio driver (not shown). In addition, according to an embodiment of the present disclosure, the device driver 312 may include an Inter-Process Communication (IPC) driver (not shown).

The middleware 330 may include a plurality of modules which are implemented in advance to provide a function that the applications 370 commonly require. In addition, the middleware 330 may provide a function via the API 360 so that the applications 370 may effectively use limited system resources of the electronic device.

For example, referring to FIG. 3, the middleware 330 (e.g., the middleware 132) may include at least one of a run time library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

For example, the run time library 335 may include a library module which is used by a compiler to add a new function through a programming language while the application 370 is being executed. According to an embodiment of the present disclosure, the run time library 335 may perform a function on an input/output, memory management, or an arithmetic function. The application manager 341 may manage a life cycle of at least one application from among the applications 370. The window manager 342 may manage GUI resources used on a screen.

The multimedia manager 343 may grasp a format necessary for reproducing various media files and may encode or decode the media file by using a CODEC matching a corresponding format. The resource manager 344 may manage resources of at least one application from among the applications 370, such as a source code, a memory, a storage space, etc. The power manager 345 may operate along with a Basic Input/Output System (BIOS) to manage a battery or power, and may provide power information necessary for an operation. The database manager 345 may manage generating, retrieving, or changing a database to be used in at least one application from among the applications 370.

The package manager 347 may manage installing or updating an application distributed in the form of a package file. The connectivity manager 348 may manage wireless connection of WiFi, Bluetooth, etc. The notification manager 349 may display or notify an event such as a message arrival, an appointment, an approach notification, etc., in a method that does not obstruct the user. The location manager 350 may manage location information of the electronic device.

The graphic manager 351 may manage a graphic effect to be provided to the user or a user interface related to the graphic effect. The security manager 352 may provide all security functions necessary for system security or user authentication. According to an embodiment of the present disclosure, when the electronic device (e.g., the electronic device 100) is equipped with a telephony function, the middleware 330 may further include a telephony manager (not shown) for managing a voice or video communication function of the electronic device.

The middleware 330 may generate a new middleware module by combining various functions of the above-described inner element modules and may use the new middleware module. The middleware 330 may provide a module specialized for each kind of OS to provide a differentiated function. In addition, the middleware 330 may dynamically delete some of the existing elements or may add new elements. Accordingly, some of the elements described in various embodiments of the present disclosure may be omitted, another element may be further included, or the elements may be substituted with elements of different names having similar functions.

The API 360 (e.g., the API 133) is a set of API programming functions and may have a different configuration according to an OS. For example, in the case of Android or IOS, a single API set may be provided for each platform, and, in the case of Tizen, two or more API sets may be provided. The application 370 (e.g., the application 134) may include a preloaded application or a third party application. The application 370 may include one or more of a Home function 371, a dialer 372, a Short Message Service (SMS)/Multimedia Message Service (MMS) 373, an Instant Message service 374, a browser 375, a camera application 376, an alarm 377, a contacts application 378, a voice dial function 379, an email application 380, a calendar 381, a media player 382, an album 383, and/or a clock 384.

At least a part of the programming module 300 may be implemented by an instruction stored in a computer-readable storage medium. When the instruction is executed by one or more processors (e.g., the processor 210), the one or more processors may perform a function corresponding to the instruction. The computer-readable storage medium may be the memory 260, for example. At least a part of the programming module 300 may be implemented (e.g., executed) by the processor 210, for example.

At least a part of the programming module 300 may include a module, a program, a routine, sets of instructions, or a process for performing one or more functions. The names of the elements of the programming module (e.g., the programming module 300) according to various embodiments of the present disclosure may vary according to a kind of OS. In addition, the programming module according to various embodiments of the present disclosure may include at least one of the above-described elements, omit some of the elements, or may further include an additional element.

Various embodiments of the present disclosure will be described herein below with reference to the accompanying drawings. In the following description, detailed descriptions of well-known functions or configurations will be omitted since they would unnecessarily obscure the subject matters of the present disclosure. Also, the terms used herein are defined according to the functions of the present disclosure. Thus, the terms may vary depending on users' or operators' intentions or practices. Therefore, the terms used herein should be understood based on the descriptions made herein.

Hereinafter, a method for downloading content of an electronic device and an electronic device thereof according to various embodiments of the present disclosure will be explained in detail. The electronic device according to various embodiments of the present disclosure may include the elements shown in FIG. 2. Various kinds of electronic devices such as smart phones, tablet PCs, etc. may be referred to as terminals in a network environment, for example. In addition, a server which provides various kinds of content such as a movie, a game, or etc. via a mobile communication network such as Long Term Evolution Advanced (LTE-A), LTE, Third Generation (3G), etc. may be referred to as a content provider server.

Figure 4:
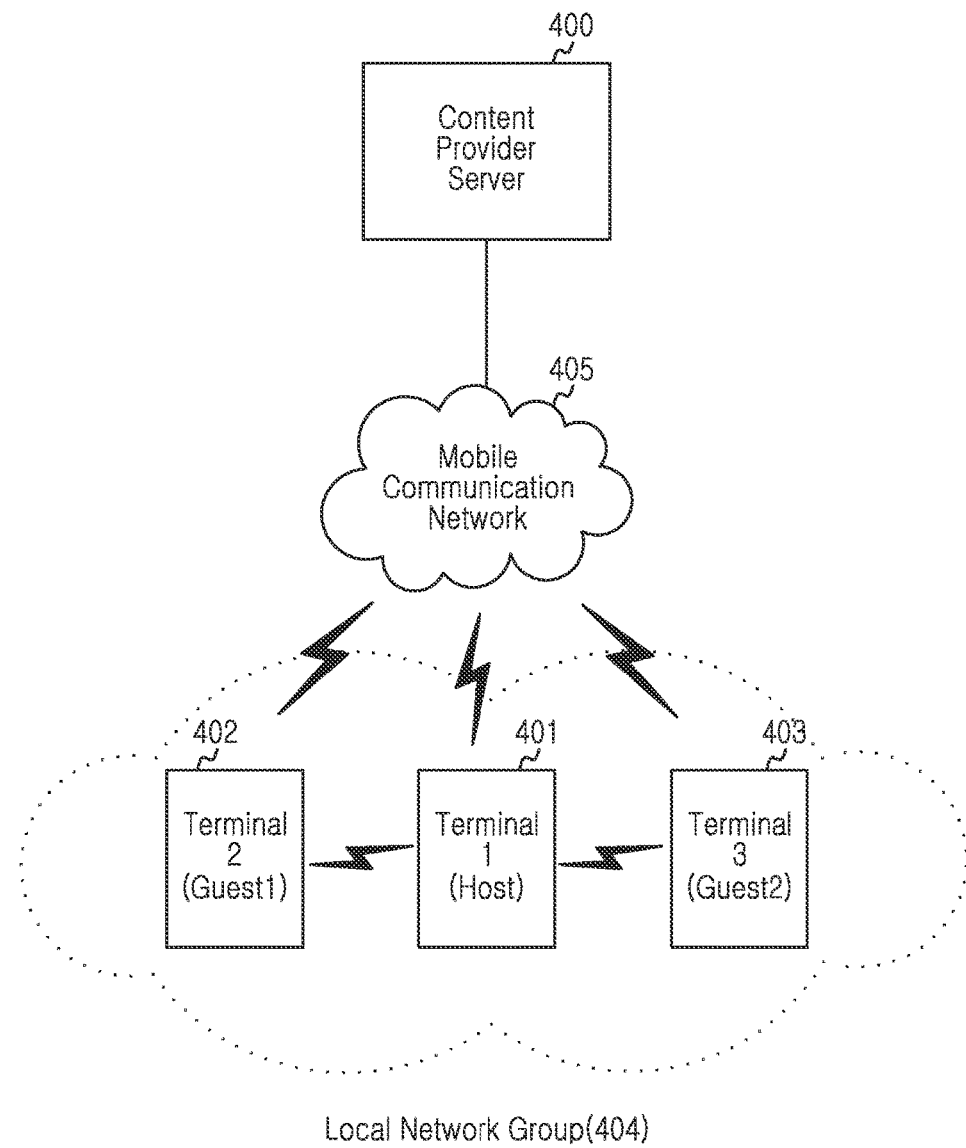
FIG. 4 is a view illustrating a network group which is formed by electronic devices according to an embodiment of the present disclosure.

FIG. 4 is a view illustrating a network group which is formed by electronic devices according to an embodiment of the present disclosure.

Referring to FIG. 4, a plurality of terminals such as smartphones, tablet PCs, etc. may download various kinds of content such as a movie, a game, etc. from a content provider server 400 that the terminals access via a mobile communication network 405. A host terminal 401, a second first guest terminal 402, and a second guest terminal 403 may form a network group 404 by using one or more local communication schemes from among WiFi-direct, Bluetooth, and NFC.

For example, the host terminal 401 may set itself as a host terminal and then may form a single network group with the first guest terminal 402 (guest 1) and the second guest terminal 403 (guest 2) by using WiFi-direct communication which is one of the local communication schemes.

The host terminal 401, the first guest terminal 402, and the second guest terminal 403, which belong to the network group 404, may share data with one another by multicasting the data in real time.

Figure 5:
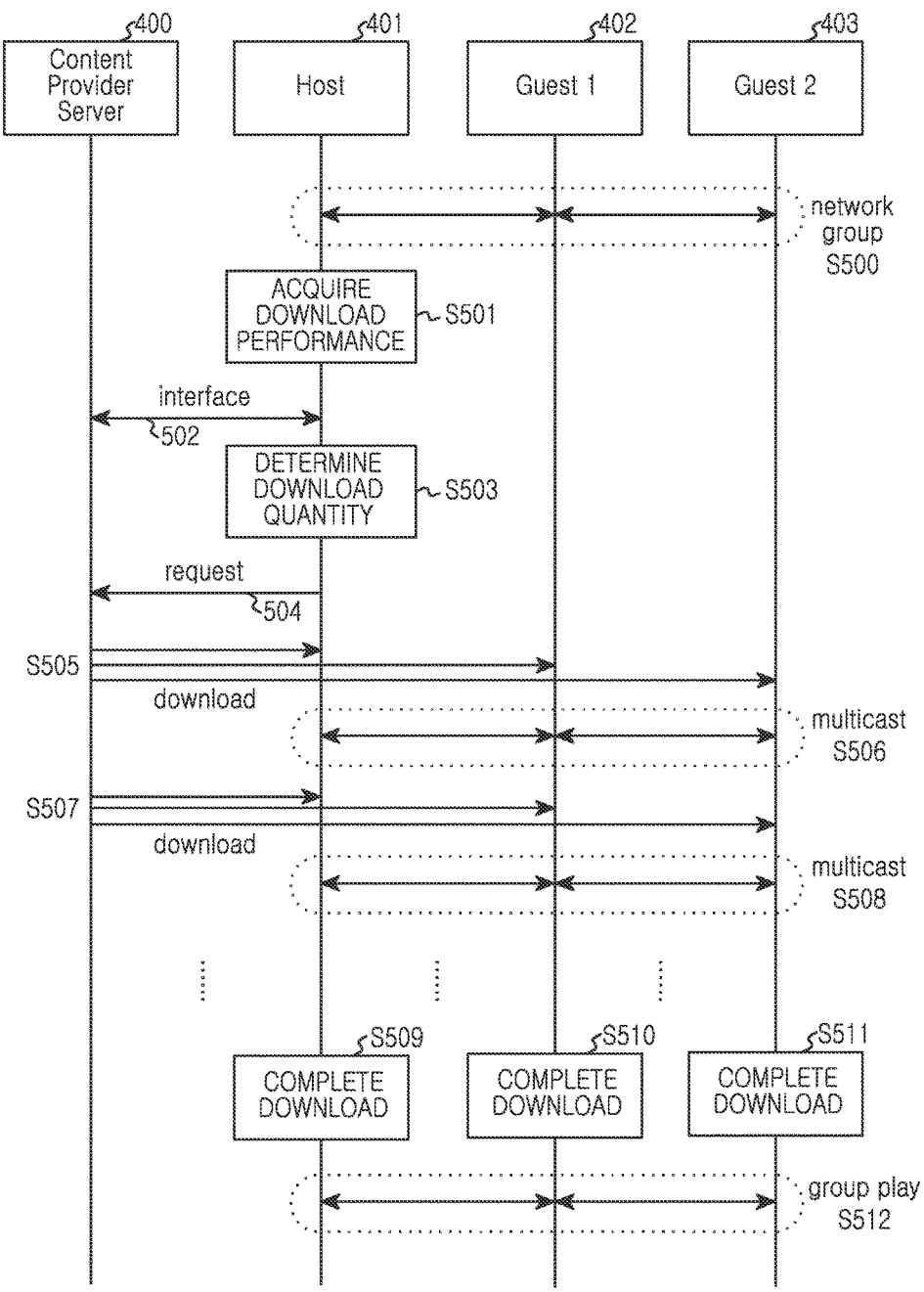
FIG. 5 is a flowchart illustrating a method for downloading content of an electronic device according to an embodiment of the present disclosure.

FIG. 5 is a flowchart illustrating a method for downloading content of an electronic device according to an embodiment of the present disclosure.

Referring to FIG. 5, the host terminal 401 forms a single network group with the first guest terminal 402 and the second guest terminal 403 by using local communication at operation S500. The host terminal 401 acquires a content download performance of the first guest terminal 402 and the second guest terminal 403 belonging to the network group at operation S501, and interfaces with the content provider server 400 via a mobile communication network at operation S502 and searches certain content that the user desires. The process of searching the certain content may precede the process of acquiring the content download performance.

For example, the host terminal 401 identifies a data capacity of online game content desired by the user by interfacing with the content provider server 400, and then determines a quantity of content to be downloaded to each of the first guest terminal 402 and the second guest terminal 403 separately based on the content download performance of the first guest terminal 402 and the second guest terminal 403 at operation S503. The host terminal 401 generates a request message for requesting the determined quantity of content to be downloaded to each of the first guest terminal and the second guest terminal separately and the remaining quantity of content to be downloaded to the host terminal 401 itself, and then transmits the request message to the content provider server 400 at operation S504.

The content provider server 400 divides original content into the determined quantity of content according to the request message, and then downloads the divided quantity of content to the first guest terminal 402 and the second guest terminal, respectively, and downloads the remaining quantity of content to the host terminal 401 at operation S505. The host terminal 401, the first guest terminal 402, and the second guest terminal 403 may download the content separately transmitted from the content provider server 400 through the above-described process and may perform a multicast operation to share the downloaded data with one another in real time using the local communication at operation S506.

When the download operation at operation S507 and the multicast operation at operation S508 are repeatedly performed and the host terminal 401, the first guest terminal 402, and the second guest terminal 403 complete the download operation of the content at operations S509, S510, and S511, a group play is performed by executing the downloaded content simultaneously according to a user's request afterward. Accordingly, the time that each terminal of the network group requires to finish downloading the content may be reduced and a user waiting time for the group play in operation S512 may be reduced.

Figure 6:
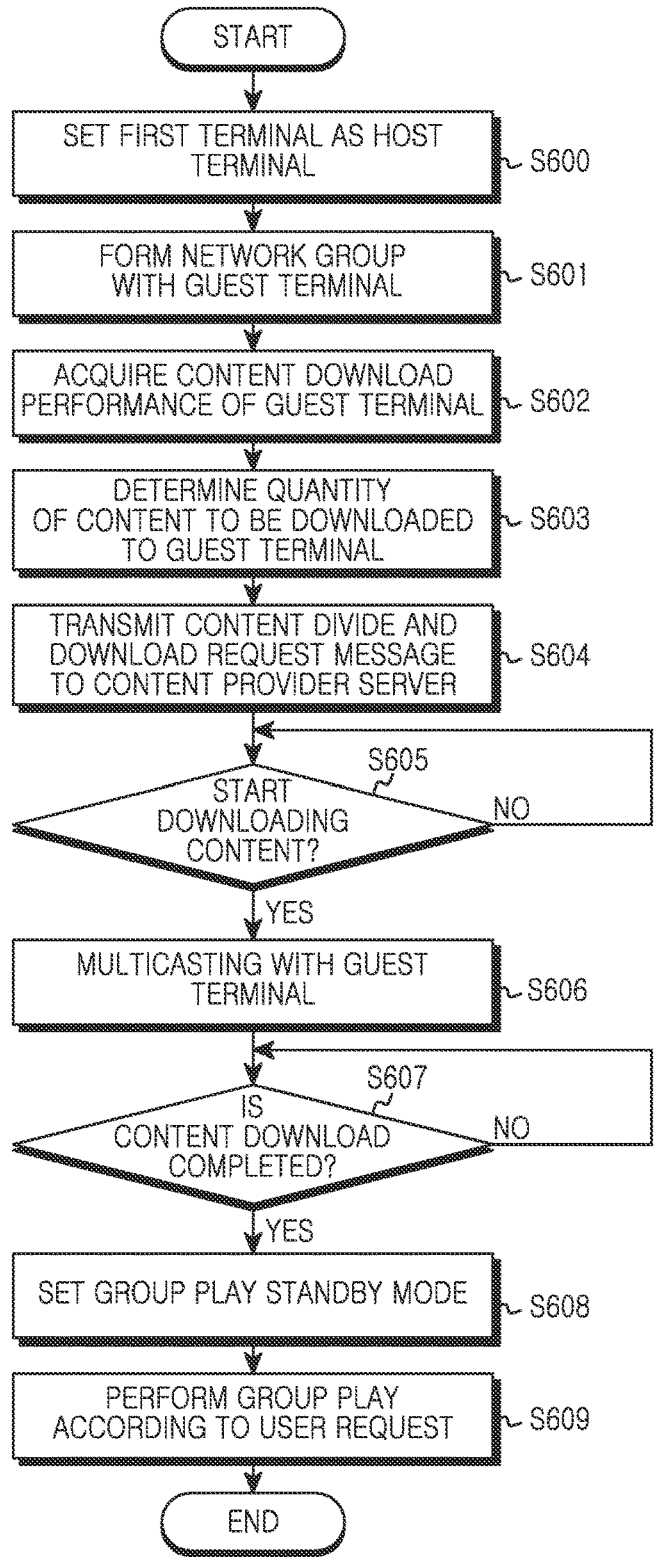
FIG. 6 is a flowchart illustrating a method for downloading content of a host terminal according to an embodiment of the present disclosure.

FIG. 6 is a flowchart illustrating a method for downloading content of a host terminal according to an embodiment of the present disclosure.

Referring to FIG. 6, the first terminal 401, the second terminal 402, and the third terminal 403 such as smartphones, tablet PCs, etc. may be an LTE-A terminal, an LTE terminal, and a 3G terminal, respectively. The processor of the first terminal 401, which is the LTE-A terminal, sets itself as a host terminal at operation S600, and forms a single network group by setting the second terminal 402, which is the LTE terminal, and the third terminal 403, which is the 3G terminal 403, as a first guest terminal (guest 1) and a second guest terminal (guest 2) at operation S601.

For example, the network group may be formed in a WiFi-direct scheme which is one of the local communication schemes, and furthermore may be formed in various kinds of local communication schemes such as Bluetooth, NFC, etc. Thereafter, the processor of the host terminal 401 may acquire a content download performance of the first guest terminal 402 and the second guest terminal 403 based on a kind of a mobile communication network that the first guest terminal 402 and the second guest terminal 403 access and a kind of a local communication module used for forming the network group at operation S602.

For example, the processor of the host terminal determines whether the kind of the mobile communication network that the guest terminal accesses is one or more of the LTE-A, LTE, and 3G, and furthermore determines whether the kind of the local communication module used for forming the network group is one or more of the WiFi module, Bluetooth module, and NFC module. According to a result of the determining, the processor of the host terminal acquires the content download performance of the guest terminal. For example, the content download performance may increase in order of 3G (e.g., 20 Mbps), LTE (e.g., 80 Mbps), and LTE-A (e.g., 150 Mbps), and may increase in order of the NFC module, the Bluetooth module, and the WiFi module.

Furthermore, the content download performance may vary according to class of each local communication module. The content download performance of the guest terminal may depend on the kind of the local communication module used for forming the network group. For example, when the data transmission speed of the WiFi module, which is the local communication module of the first guest terminal 402, is 50 Mbps, the content download performance of the first guest terminal 402 depends on the data transmission speed of the WiFi module, which is 50 Mbps, even when the LTE speed of the first guest terminal 402 is 80 Mbps.

This is because the content downloaded via the mobile communication network should be multicasted via the local communication network in real time and each terminal belonging to the network group should share the content with one another as described above. That is, when the multicast speed of the local communication network is slow, the time that each terminal requires to download the content, perform the multicast, and receive the whole data of the content increases since the content download performance depends on the multicast speed, even when the content download speed of the mobile communication network is fast.

The processor of the host terminal 401 determines a quantity of content to be downloaded to each guest terminal based on the content download performance of the first guest terminal 402 and the content download performance of the second guest terminal 403 at operation S603. For example, when the content download performances of the host terminal 401, the first guest terminal 402, and the second guest terminal 403 are 100 Mbps, 50 Mbps, and 20 Mbps, respectively, and the data capacity of the online game content to be downloaded from the content provider server 400 is 1,700,000 MB, the quantity of the content to be downloaded to the host terminal 401, the first guest terminal 402, and the second guest terminal 403 are determined to be 1,000,000 MB, 500,000 MB, and 200,000 MB, respectively.

The processor of the host terminal 401 generates a request message for requesting the determined quantity of content to be downloaded to each of the first guest terminal 402 and the second guest terminal 403, and the remaining quantity of content to be downloaded to the host terminal itself, and transmits the request message to the content provider server 400 at operation S604.

FIG. 7 is a view illustrating elements of a request message transmitted from a host terminal to a content provider server according to an embodiment of the present disclosure.

Referring to FIG. 7, the elements of the request message may include various parameters such as access_token, deviceIP, deviceId, transferRange, hostYn, etc. The device may be changed to the terminal.

The access_token may be used as an authentication key of an API, and the deviceIP and deviceId may be used as access information and identification information of a terminal to download a content. The transferRange may be used as a quantity or section of content to be downloaded by a terminal, and the hostYn may be used as an identification value indicating whether a terminal is a host terminal or not.

FIG. 8 is a view illustrating a request message transmitted from a host to a content provider server according to an embodiment of the present disclosure.

Referring to FIG. 8, the request message may be divided into an URL, a HEADER, a BODY, etc. For example, the BODY includes deviceIp "231.293.99.12" as access information of the host terminal, deviceId "1" as identification information of the host terminal, transferRange "0-1000000" as quantity or section information of content to be downloaded by the host terminal, and hostYn "y" as information indicating that the terminal is the host terminal.

In addition, the BODY may include device Ip "231.293.99.23" as access information of the first guest terminal, deviceId "2" as identification information of the first guest terminal, transferRange "1000000-1500000" as quantity or section information of content to be downloaded by the first guest terminal, and hostYn "n" as information indicating that the terminal is not the host terminal. In addition, the BODY may include device Ip "231.293.99.162" as access information of the second guest terminal, deviceId "3" as identification information of the second guest terminal, transferRange "1500001-1700000" as quantity or section information of content to be downloaded by the second guest terminal, and hostYn "n" as information indicating that the terminal is not the host terminal.

Figure 9:
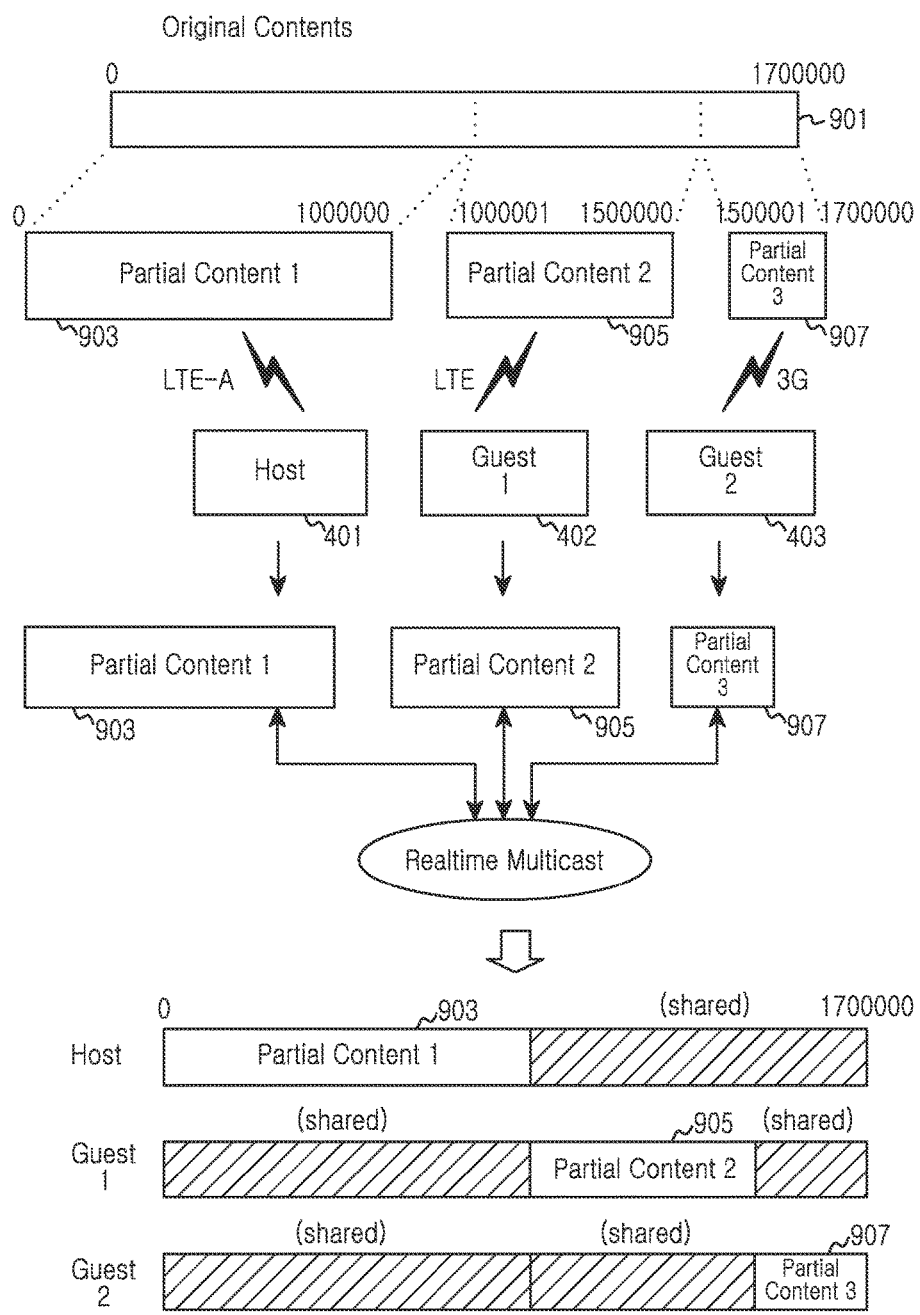
FIG. 9 is a view illustrating a process for downloading and sharing content according to an embodiment of the present disclosure.

FIG. 9 is a view illustrating a process of downloading and sharing content according to an embodiment of the present disclosure.

For example, referring to FIG. 9, the content provider server 400 performs a content dividing and downloading operation to divide certain original content 901 into 3 partial content 1 903, partial content 2 905, partial content 3 907 according to the request message, and download the content to the host terminal 401, the first guest terminal 402, and the second guest terminal 403 simultaneously.

Accordingly, the first partial content 1 of the section of "0-1000000" are downloaded to the host terminal 401, the second partial content 2 of the section of "1000001-1500000" are downloaded to the first guest terminal 402, and the third partial content 3 907 of the section of "1500001-1700000" are downloaded to the second guest terminal 403.

When the first partial content 903 of the section of "0-1000000" are downloaded as described above at operation S605, the host terminal 401 multicasts the downloaded first partial content 903 to the first guest terminal 402 and the second guest terminal 403 of the network group by using the local communication to share the content at operation S606. When the second partial content 905 of the section of "1000001-1500000" are downloaded as described above, the first guest terminal 402 multicasts the downloaded second partial content 905 to the host terminal 401 and the second guest terminal 403 of the network group by using the local communication to share the content.

When the third partial content 907 of the section of "1500001-1700000" are downloaded as described above, the second guest terminal 403 multicasts the downloaded third partial content 907 to the host terminal 401 and the first guest terminal 402 of the network group by using the local communication to share the content. When the content download operation is completed by downloading and multicasting as described above at operation S607, the host terminal 401 sets a group play standby mode at operation S608 and performs a group play operation according to a user's request by using the local communication afterward at operation S609.

For example, the host terminal 401 downloads the first partial content 903 via the mobile communication network and shares the other content by the multicast operation of the first guest terminal 402 and the second guest terminal 403 as shown in FIG. 9. The first guest terminal 402 downloads the second partial content 905 via the mobile communication network and shares the other content by the multicast operation of the host terminal 401 and the second guest terminal 403.

The second guest terminal 403 downloads the third partial content 907 via the mobile communication network and shares the other content by the multicast operation of the host terminal 401 and the first guest terminal 402.

Figure 10:
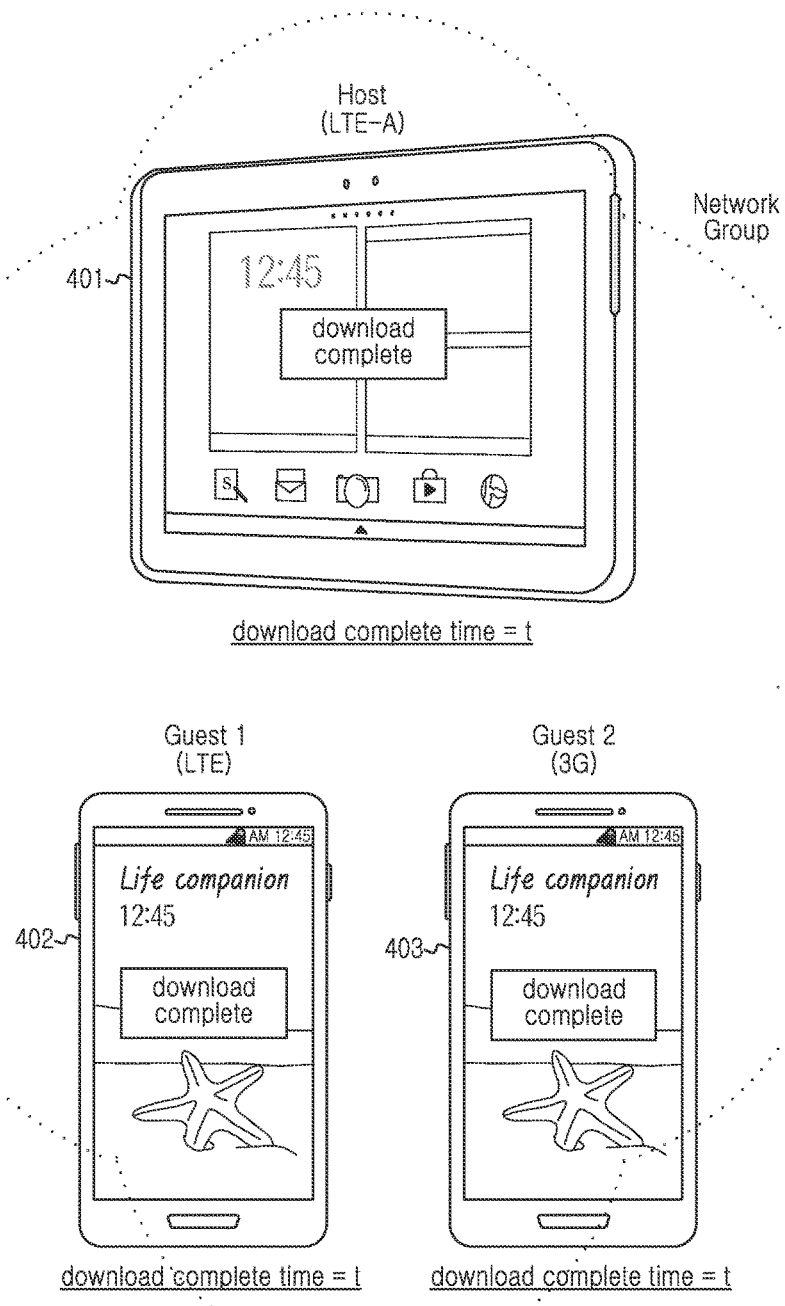
FIG. 10 is a view illustrating a content download operation which is completed in each terminal simultaneously according to an embodiment of the present disclosure.

FIG. 10 is a view illustrating a content download operation being completed in each terminal simultaneously according to an embodiment of the present disclosure.

When the content download operation is normally completed by the download and multicast operation as described above, the host terminal 401, the first guest terminal 402, and the second guest terminal 403 may display a guide message informing the completion of the content download on their respective display screens at the same time or within an error tolerance time range, as shown in FIG. 10.

Accordingly, the time that each terminal of the network group requires to download the content may be reduced and the user waiting time for the group play may be reduced. Furthermore, even when a certain terminal belonging to the network group does not subscribe to a content provider network, the terminals belonging to the network group may share the content by multicasting the content to one another.

When the download operation from the content provider server 400 is normally completed, the first guest terminal 402 and the second guest terminal 403 may generate a notification message for notifying the completion and may transmit the notification message to the host terminal 401. The host terminal 401 may determine whether the content download operation is normally completed or not according to whether the notification message is received or not. Furthermore, the host terminal 401 may monitor an amount of data received by the multicast operation of the first guest terminal 402 and the second guest terminal 403, and may determine whether the content download operation is normally performed or not.

When it is determined that the content download operation is abnormally performed according to whether the notification message is received or not or a result of the monitoring the amount of data received by the multicast operation, the host terminal 401 may re-determine a quantity of content to be downloaded to the first guest terminal 402 and the second guest terminal 403, generate a corresponding request message, and re-transmit the request message to the content provider server 400. Furthermore, the host terminal 401 may download a certain amount of data predefined to each terminal as a test by interfacing with the content provide server 400, determine whether the normal download operation is performed or not in advance, and determine a quantity of content to be downloaded to each terminal, so that the content dividing and downloading operation may be more optimized reflecting a network environment.

According to various embodiments of the present disclosure, the time that each terminal of the network group requires to download the content may be reduced and the user waiting time required until the users of the terminals may share the downloaded content in real time and may execute the group play may be reduced. Furthermore, even when a certain terminal belonging to the network group does not subscribe to a content provider network, the terminals belonging to the network group may share the content by multicasting the content to one another.

Methods based on the various embodiments disclosed in the claims and/or specification of the present disclosure may be implemented in hardware, software, or a combination of both. When implemented in software, a computer readable recording medium for storing one or more programs (i.e., software modules) may be provided. The one or more programs stored in the computer readable recording medium are configured for execution performed by one or more processors in an electronic device.

The one or more programs include instructions for allowing the electronic device to execute the methods based on the various embodiments disclosed in the claims and/or specification of the present disclosure. The program (the software module or software) may be stored in a random access memory, a non-volatile memory including a flash memory, a ROM, an EEPROM, a magnetic disc storage device, a Compact Disc-ROM (CD-ROM), DVDs or other forms of optical storage devices, and a magnetic cassette.

Alternatively, the program may be stored in a memory configured in combination of all or some of these storage media. In addition, the configured memory may be plural in number. Further, the program may be stored in an attachable storage device capable of accessing the electronic device through a communication network such as the Internet, an Intranet, a LAN, a WLAN, or a Storage Area Network (SAN) or a communication network configured by combining the networks. The storage device may access via an external port to the electronic device according to the various embodiments of the present disclosure. In addition, a separate storage device on the communication network may access the device according to the various embodiments of the present disclosure.

In the above-described various embodiments of the present disclosure, the elements included in the disclosure are expressed in a singular or plural form according to an embodiment of the present disclosure. However, the singular or plural expression is appropriately selected according to a proposed situation for the convenience of explanation and the disclosure is not limited to a single element or a plurality of elements. The elements expressed in the plural form may be configured as a single element and the elements expressed in the singular form may be configured as a plurality of elements.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for operating of a mobile terminal comprising a communication processor that is configured to control a communication module to access a mobile communication network for interfacing to a server storing a content and accessing a local communication network, the method comprising:
   forming a network group, by using the local communication network, with another mobile terminal;
   setting the mobile terminal as a host terminal and the another mobile terminal as a guest terminal;
   acquiring, by using the local communication network, a type of another mobile communication network being used by the another mobile terminal;
   identifying, a data capacity of the content to be downloaded by interfacing to the server storing the content;
   based on the identifying the data capacity of the content, determining, a portion of the content to be downloaded to the another mobile terminal and a remaining portion of the content to be downloaded to the mobile terminal based on the type of the another mobile communication network, a type of the mobile communication network being used by the mobile terminal, and a type of the local communication network; and
   based on the determination, transmitting, to the server through the mobile communication network, a message for requesting to transmit the portion of the content to the another mobile terminal and to transmit the remaining portion of the content to the mobile terminal,
   wherein the message includes identification information of the mobile terminal, information indicating that the mobile terminal is the host terminal, section information of the remaining portion of the content, identification information of the another mobile terminal, information indicating that the another mobile terminal is the guest terminal, and section information of the portion of the content.

2. The method of claim 1, wherein the type of the local communication network comprises at least one of wireless fidelity (Wi-Fi)-direct and near field communication.

3. The method of claim 1,
   wherein the remaining portion of the content received from the server is transmitted, by using the local communication network, to the another mobile terminal.

4. The method of claim 1, wherein the type of the mobile communication network comprises at least one of long term evolution advanced (LTE-A), LTE, or third generation (3G), and
   wherein the type of the another mobile communication network comprises at least one of long term evolution advanced (LTE-A), LTE, or third generation (3G).

5. The method of claim 1, further comprising performing, with the another mobile terminal, a group play associated with the content, by using the local communication network.

6. The method of claim 1, wherein the another mobile terminal transmits to the server, a notifying message for notifying that the transmitting the portion of the content to the another mobile terminal is normally completed.

7. The method of claim 1, wherein the message further includes information about access of the mobile terminal and the another mobile terminal and authentication key.

8. The method of claim 1,
wherein the content stored in the server is divided into the portion of the content and the remaining portion of the content based on the message,
wherein the portion of the content is transmitted from the server to the another mobile terminal, and
wherein the remaining portion of the content is transmitted from the server to the mobile terminal.

9. The method of claim 1, wherein the portion of the content received from the server to the another mobile terminal is transmitted, by using the local communication network, to the mobile terminal.

10. A mobile terminal comprising:
a processor comprising an application processor and a communication processor, wherein the communication processor is configured to control a communication module to access a mobile communication network for interfacing to a server storing a content
and accessing a local communication network
wherein the processor is configured to:
control the communication module to form a network group, by using the local communication network, with another mobile terminal,
set the mobile terminal as a host terminal and the another mobile terminal as a guest terminal,
acquire, by using the local communication network, a type of another mobile communication network being used by the another mobile terminal,
identify, a data capacity of the content to be downloaded by interfacing to the server storing the content,
based on the identifying the data capacity of the content, determine a portion of the content to be downloaded to the another mobile terminal and a remaining portion of the content to be downloaded to the mobile terminal based on the type of the another mobile communication network, a type of the mobile communication network being used by the mobile terminal, and a type of the local communication network, and
based on the determination, transmit, to the server through the mobile communication network, a message for requesting to transmit the portion of the content to the another mobile terminal and to transmit the remaining portion of the content to the mobile terminal,
wherein the message includes identification information of the mobile terminal, information indicating that the mobile terminal is the host terminal, section information of the remaining portion of the content, identification information of the another mobile terminal, information indicating that the another mobile terminal is the guest terminal, and section information of the portion of the content.

11. The mobile terminal of claim 10, wherein the type of the local communication network comprises at least one of wireless fidelity (Wi-Fi)-direct and near field communication.

12. The mobile terminal of claim 10, wherein the remaining portion of the content received from the server is transmitted, by using the communication network, to the another mobile terminal.

13. The mobile terminal of claim 10,
wherein the type of the mobile communication network comprises at least one of long term evolution advanced (LTE-A), LTE, or third generation (3G), and
wherein the type of the another mobile communication network comprises at least one of long term evolution advanced (LTE-A), LTE, or third generation (3G).

14. The mobile terminal of claim 10, wherein the processor is further configured to perform, with the another mobile terminal, a group play associated with the content, by using the local communication network.

15. The mobile terminal of claim 10, wherein the another mobile terminal transmits to the server, a notifying message for notifying that the transmitting the portion of the content to the another mobile terminal is normally completed.

16. The mobile terminal of claim 10, wherein the message further includes information about access of the mobile terminal and the another mobile terminal and authentication key.

17. The mobile terminal of claim 10,
wherein the content stored in the server is divided into the portion of the content and the remaining portion of the content based on the message,
wherein the portion of the content is transmitted from the server to the another mobile terminal, and
wherein the remaining portion of the content is transmitted from the server to the mobile terminal.

18. The mobile terminal of claim 10, wherein the portion of the content received from the server to the another mobile terminal is transmitted, by using the local communication network, to the mobile terminal.

19. A non-transitory computer readable storage medium for storing one or more programs that when executed by at least one processor of a mobile terminal perform the method of:
forming a network group, by using a local communication network, with another mobile terminal;
setting the mobile terminal as a host terminal and the another mobile terminal as a guest terminal;
acquiring, by using the local communication network, a type of another mobile communication network being used by the another mobile terminal;
identifying, a data capacity of a content to be downloaded by interfacing to a server storing the content;
based on identifying the data capacity of the content, determining, a portion of the content to be downloaded to the another mobile terminal and a remaining portion of the content to be downloaded to the mobile terminal based on the type of the another mobile communication network, a type of a mobile communication network being used by the mobile terminal, and a type of the local communication network; and
based on the determination, transmitting, to the server storing a content, through the mobile communication network, a message for requesting to transmit the portion of the content to the another mobile terminal and to transmit the remaining portion of the content to the mobile terminal,
wherein the message includes identification information of the mobile terminal, information indicating that the mobile terminal is the host terminal, section information of the remaining portion of the content, identification information of the another mobile terminal, information indicating that the another mobile terminal is the guest terminal, and section information of the portion of the content.

* * * * *